United States Patent [19]

Curtis

[11] 4,137,540
[45] Jan. 30, 1979

[54] CAMERA MATTE BOX

[76] Inventor: Jack Curtis, P.O. Box 1853, Santa Monica, Calif. 90406

[21] Appl. No.: 842,287

[22] Filed: Oct. 14, 1977

[51] Int. Cl.² ............................................. G03B 11/00
[52] U.S. Cl. ....................................... 354/296; 350/59; 354/122
[58] Field of Search ...................... 354/295, 296, 122; 350/58–60

[56] References Cited
U.S. PATENT DOCUMENTS 3,918,078  11/1975  Savage .................. 354/296
            .............................. 354/295 X

*Primary Examiner*—John Gonzales
*Attorney, Agent, or Firm*—Harris, Kern, Wallen & Tinsley

[57] ABSTRACT

A matte box for mounting on a camera and serving as a lens shade and as a support for filters, special effects, masks and the like. A shell for mounting on a camera and slidingly receiving a tray with the tray adapted for carrying the various filters and masks. A lens shade shell with interchangeable trays for quickly changing filter and/or mask loads.

10 Claims, 5 Drawing Figures

U.S. Patent  Jan. 30, 1979  4,137,540
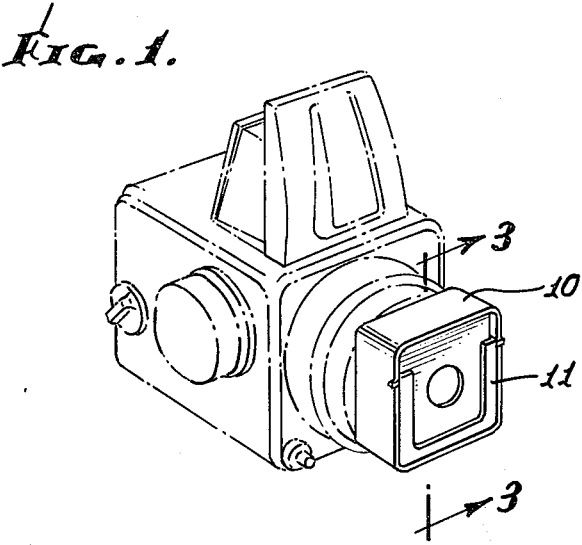
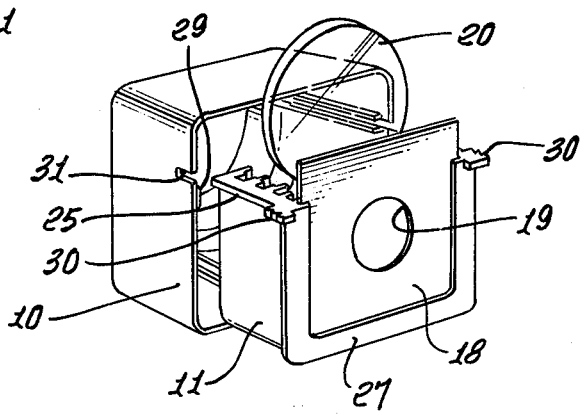
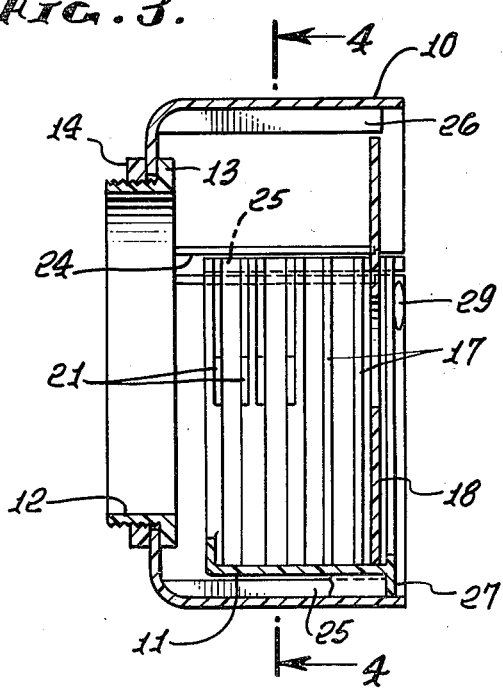
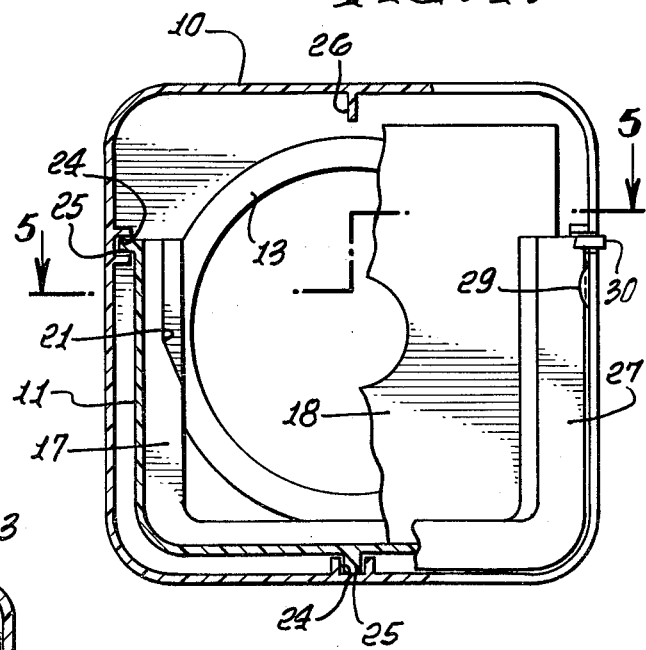
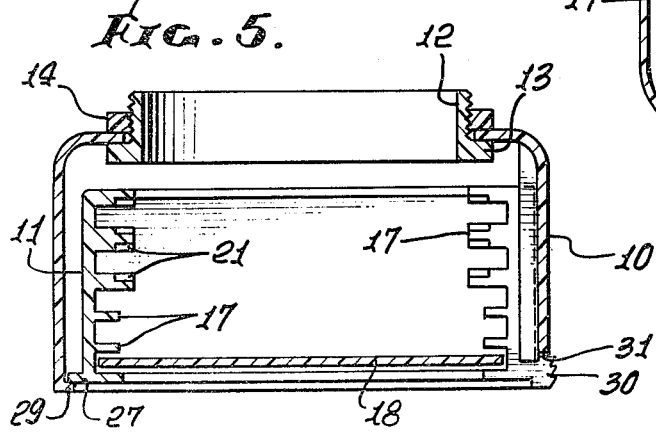

CAMERA MATTE BOX

BACKGROUND OF THE INVENTION

This invention relates to cameras and in particular, to a new and improved camera attachment which serves both the function of a lens shade and a matte box. Lens shades are well known and widely used for cameras. A typical lens shade comprises a circular or square shell or tube which is attached to and projects forward from the lens of the camera, for the purpose of shading the lens from light coming from the side.

Photographers utilize filters and masks in a variety of ways for achieving special effects in photographs, including masking, vignetting, multiple images, super impositions, and the like. In the past, this has been accomplished in one manner by the photographer holding a suitable mask or other object manually at a location between the subject and the lens.

Also, a matte box has been used for this purpose in the past. This prior art matte box had openings at opposite ends and a hinged top which premitted insertion and removal of masks. The matte box was attached to the camera at one open end. If desired, a lens shade could be attached to the matte box at the other open end, but ordinarily the photographer utilizes either the lens shade or the matte box. For more information on the use of masks and the like for special effects, reference may be made to the book "The Magic of Imagery and Special Effects" by Jack Curtis, published by Jeune and Jack Curtis, P O Box 1853, Santa Monica, California 90406.

The prior art matte box was difficult to use and awkward to handle. The masks were not easily inserted, removed or changed. Problems were encountered with loose masks, particularly when cameras were oriented in a variety of positions.

Accordingly, it is an object of the present invention to provide a new and improved combination lens shade and matte box which can serve function of both items without imparing the functioning of either. Further object is to provide such a new and improved box with interchangeable trays which permit rapid substitution of one set of fibers and/or masks for another. Other objects, advantages, features and results will more fully appear in the course of the following description.

SUMMARY OF THE INVENTION

The matte box of the present invention includes a shell for mounting on a camera and serving as a lens shade, and a tray for sliding insertion into the shell and carrying one or more filters and/or masks. Preferably, the shell and tray include interengageing guide means and a lock means for sliding insertion of the tray into a predetermined position and maintenance of the tray in that position, and maintenance of the filters and/or masks in position within the tray. Provision is made for handling square items and circular items, and for one hand insertion and removal of the tray.

BRIEF DESCRIPTION OF THE DRAWING

FIG. 1 is an isometric view of a camera with a matte box incorporating the presently preferred embodiment of the invention mounted thereon;

FIG. 2 is an enlarged exploded view of the matte box of FIG. 1;

FIG. 3 is an enlarged sectional view taken along the line 3—3 of FIG. 1;

FIG. 4 is a sectional view taken along the line 4—4 of FIG. 3; and

FIG. 5 is a sectional view taken along line 5—5 of FIG. 4.

DESCRIPTION OF THE PREFERRED EMBODIMENT

The combination lens shade and matte box listed in the drawing includes a shell 10 and a tray 11 which slides into and out of the shell. The shell is designed for mounting on a camera, as illustrated in FIG. 1, and various mounting means may be utilized. In the embodiment illustrated, as best seen in FIGS. 3 and 5, a mounting ring 12 is positioned in an opening in the shell 10, with an annular rim 13 engageing the inner wall of the shell at the opening. The ring 12 is threaded on the outside diameter for insertion into a camera lens ring. A retaining ring 14 is threaded onto the mounting ring 12 for clamping the shell 10 between the two rings. Typically, the ring 14 is screwed down hand tight so as to maintain the shell fixed with respect to the rings under normal use, but permitting rotation of the shell to the desired operating position after installation on a camera. The shell 10 when mounted on a camera functions as a lens shade either with the tray inserted as shown in FIG. 1 or with the tray removed as shown in FIG. 2.

The tray 11 typically has a U-shaped, with opposed inwardly projecting ribs defining slots between the ribs for insertion of filters, masks, and the like. A typical mask 18 is best seen in FIG. 2 and comprises an opaque square of material, typically plastic, with a circular central opening 19. One or more such masks may be inserted in the tray as desired, and in the embodiment illustrated, provision is made for up to 5 masks or other inserts.

Most masks are square and readily fit into the U-shape of the tray. However, many photographic filters are circular or disc shaped, as shown at 20 in FIG. 2. The preferred embodiment of the tray includes a special rib configuration for receiving and centering the filter discs. Some of the ribs are provided with arcuate shoulders 21 having substantially the same radius as the filter disc so that a filter is centered along the axis of the lens when inserted into the tray which in turn is inserted into the shell mounted on the camera.

The shell and tray incorporated interengageing guides for ease of insertion and removal of the tray and for alignment of the tray. In the embodiment illustrated, channels 24 are provided on the bottom and on each side of the shell, and corresponding ribs 25 are provided on the tray for sliding into and out of the channels. A depending rib 26 may be provided along the inner surface of the top of the shell to serve as a retainer for maintaining the masks and/or filters in position as the camera is moved in various orientations.

A flange 27 may be provided around the outer face of the tray 11, and the channels 24 and flange 27 may be dimensioned so that the flange 27 will engage the outer ends of the channels 24 as stops for limiting insertion of the tray into the shell.

Means also may be provided for locking the tray in the shell and in the embodiment illustrated, small ribs 29 are provided on opposing sidewalls of the shell at the outer edge. The ribs 29 are an interference fit with the flange 27 so that the upstanding arms of the tray are compressed slightly toward each other when the flange is moved past the ribs to the position shown in FIG. 5. This interference condition provides for retaining the tray in position within the shell. Bosses 30 project from each side of the tray through slots 31 in the shell. To remove the tray, the photographer grasps the bosses between his thumb and a finger and squeezes slightly to compress the tray, after which it may be withdrawn from the shell. The tray is inserted with a slight amount of pressure pushing the flange past the locking ribs.

In use, the photographer mounts the shells on his camera and uses it in the conventional manner as a lens shade. The photographer may have several trays each loaded with a different combination of filters and/or masks. For a particular special effect, he selects the appropriate tray, inserts it into the shell, makes the exposure, and removes the tray. Another tray may be inserted for another exposure and removed, as desired. Alternatively, the photographer may operate with a single tray, changing the make-up of the components in the tray between exposures.

By using this device, the photographer always has his lens shade, and can at any time attach any desired maks and/or filter without having to remove or otherwise manipulate the lens shade. The masks and filters are held firmly in predetermined positions and can be installed without requiring any additional attachment to the camera. The shell and tray are lightweight and durable and are readily manufactured utilizing plastic molding techniques.

I claim:

1. A camera matte box comprising in combination:
a shell having at one end mounting means for mounting said shell on a camera and at the opposite end, guide means for slidingly receiving a tray; and
a tray for sliding insertion into said shell, said tray including means for supporting a mask therein.

2. A matte box as defined in claim 1 wherein said tray includes a plurality of oppositely disposed inwardly facing ribs defining slots therebetween.

3. A box as defined in claim 2 wherein opposing pairs of adjacent ribs have arcuate shoulders for receiving and centering a disc.

4. A box as defined in claim 2 wherein said shell has an inwardly extending axial rib for engaging and retaining a mask in said tray.

5. A box as defined in claim 1 wherein said mounting means includes a first mounting ring positioned in an opening in said shell, with an anular shoulder engaging an inner wall of said shell, and with an externally threaded portion extending through said opening, and
a second ring threaded onto said first ring with said shell wall between said second ring and said first ring shoulder.

6. A box as defined in claim 1 including interengageing means on said shell and tray for retaining said tray within said shell 7. A box as defined in claim 1 wherein said shell has an inwardly facing first guide and said tray has a corresponding outwardly facing second guide in sliding engagement with said first guide for positioning said tray within said shell.

8. A box as defined in claim 1 wherein said shell has an inwardly facing first guide on the bottom and each side and said tray is U-shaped and has a corresponding outwardly facing second guide on the bottom and each side, with the corresponding first and second guides in sliding engagement.

9. A box as defined in claim 8 wherein said first guides are channels and said second guides are ribs, and
said tray includes shoulder means for engageing said channels limiting movement of the tray within the shell.

10. A box as defined in claim 7 wherein said shell includes an inwardly extending lock member and said tray includes a locking member, with said members normally positioned for an interference fit, and with said tray deformable permitting passage of said locking member past said lock member as said tray is installed and removed.

* * * * *

UNITED STATES PATENT AND TRADEMARK OFFICE
CERTIFICATE OF CORRECTION

PATENT NO. : 4,137,540  Page 1 of 2
DATED : January 30, 1979
INVENTOR(S) : Jack Curtis It is certified that error appears in the above-identified patent and that said Letters Patent are hereby corrected as shown below:

Column 1, line 40, before "function" insert -- the --

Column 1, line 42, before "box" insert -- matte --

Column 1, line 44, "fibers" should be -- filters --

Column 1, line 53, "interengageing" should be -- interengaging--

Column 2, line 15, "engageing" should be -- engaging --

Column 2, line 46, "interengageing" should be --interengaging--

Column 3, line 9, "shells" should be -- shell --

Column 4, lines 15 - 16, "interengageing" should be
　　　　　　　　　　　-- interengaging--

UNITED STATES PATENT AND TRADEMARK OFFICE
CERTIFICATE OF CORRECTION

PATENT NO. : 4,137,540

DATED : January 30, 1979

INVENTOR(S) : Jack Curtis

Page 2 of 2

It is certified that error appears in the above—identified patent and that said Letters Patent are hereby corrected as shown below:

Column 4, line 17, after "shell" insert -- . --

Column 4, line 31, "engageing" should be --engaging--

Signed and Sealed this

Twenty-sixth Day of June 1979

[SEAL]

Attest:

RUTH C. MASON
*Attesting Officer*

DONALD W. BANNER
*Commissioner of Patents and Trademarks*